Feb. 12, 1935. G. A. JOHNSON 1,990,605
RESERVE TANK CONTROL
Filed May 3, 1932 5 Sheets-Sheet 1

INVENTOR.
Glen A. Johnson

Feb. 12, 1935. G. A. JOHNSON 1,990,605
RESERVE TANK CONTROL
Filed May 3, 1932 5 Sheets-Sheet 3

INVENTOR.
Glen A. Johnson

Feb. 12, 1935.  G. A. JOHNSON  1,990,605
RESERVE TANK CONTROL
Filed May 3, 1932  5 Sheets-Sheet 4

INVENTOR.
Glen A. Johnson

Feb. 12, 1935.  G. A. JOHNSON  1,990,605
RESERVE TANK CONTROL
Filed May 3, 1932    5 Sheets-Sheet 5

INVENTOR
Glen A. Johnson

Patented Feb. 12, 1935

1,990,605

UNITED STATES PATENT OFFICE 1,990,605

RESERVE TANK CONTROL

Glen A. Johnson, Connersville, Ind., assignor to Stant Manufacturing Company, Connersville, Ind.

Application May 3, 1932, Serial No. 609,007

12 Claims. (Cl. 158—46.5)

This invention relates especially to that class of closure and control devices for tanks which incorporate main and reserve sections, as function to afford access to both main and reserve sections of the tank for filling both sections, and for emptying the reserve section into the main section, by means of but a single manually controlled instrumentality. Such devices of this type are represented in the constructions disclosed in my copending application, Serial No. 575,778 which was filed on November 18, 1931.

This invention herein set forth has for an object to produce such a device as will afford closure and opening of the main and reserve tank section ports simultaneously, but by means of an instrumentality which affords relative movement between the valves for purposes which will become apparent as the description proceeds.

A further object is to produce such a device as will afford independent valves to perform the function desired, but in which manual opening of the main tank section will secure automatic opening of the reserve tank section, and in which closure of the valves of both sections is accomplished manually.

Another object is to permit the exterior valve to be removed manually from its port independently of the reserve tank valve, thus permitting an unrestricted opening for introduction of liquid into the tanks through the exterior port.

These, and other objects, are attained in the reserve tank control device and closure described in the following specification, and illustrated in the accompanying drawings, in which.

Figure 5:
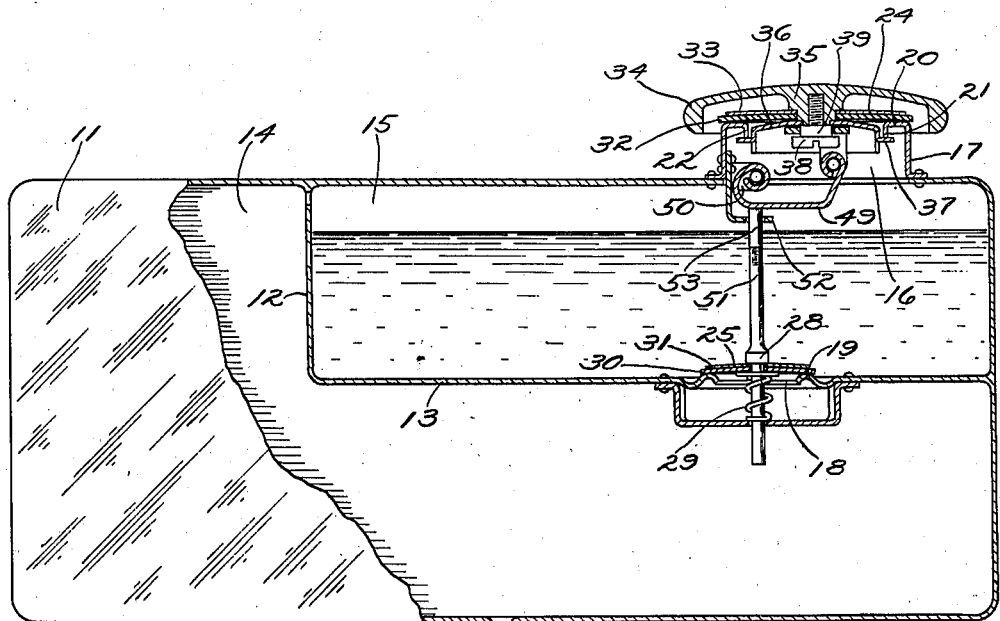
Figs. 5 and 6 are views similar to Figs. 3 and 4, and showing a further modified form of my invention, in respective closed and open condition.
Figure 6:
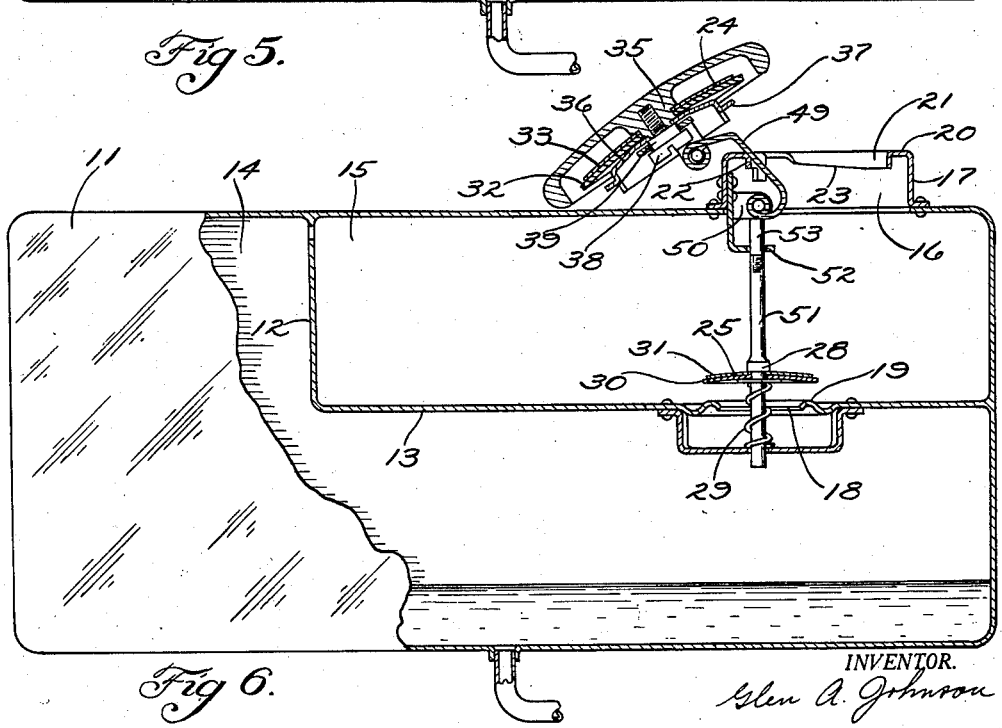
Figure 7:
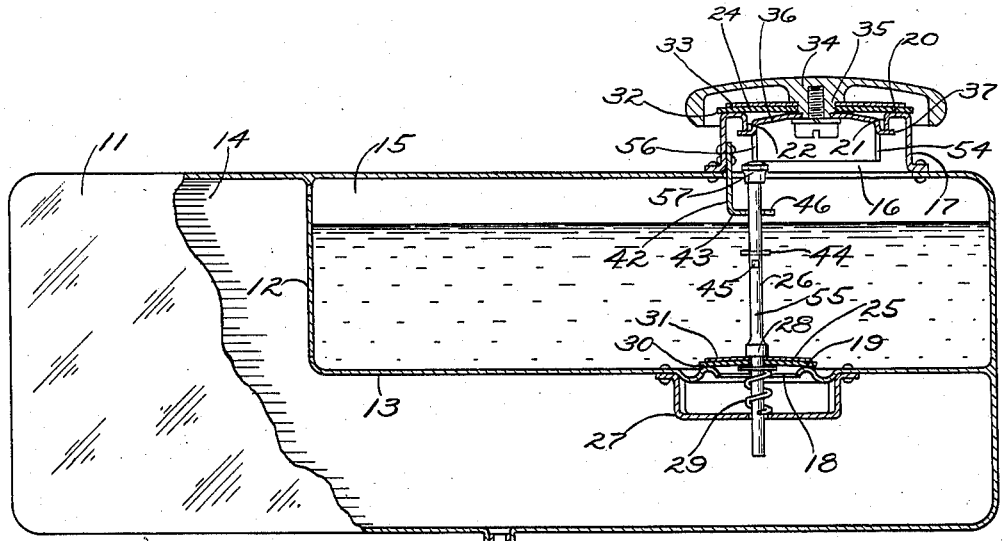
Figure 8:
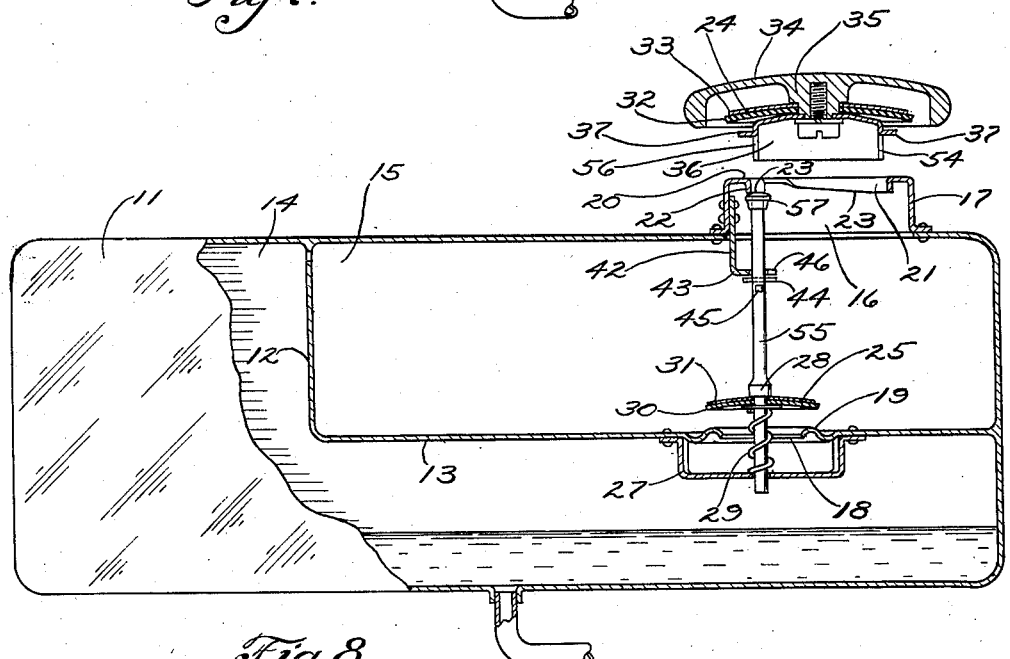

Figs. 7 and 8, like Figs. 5 and 6, show a still further modified form of my invention in respective closed and open condition.

Figure 9:
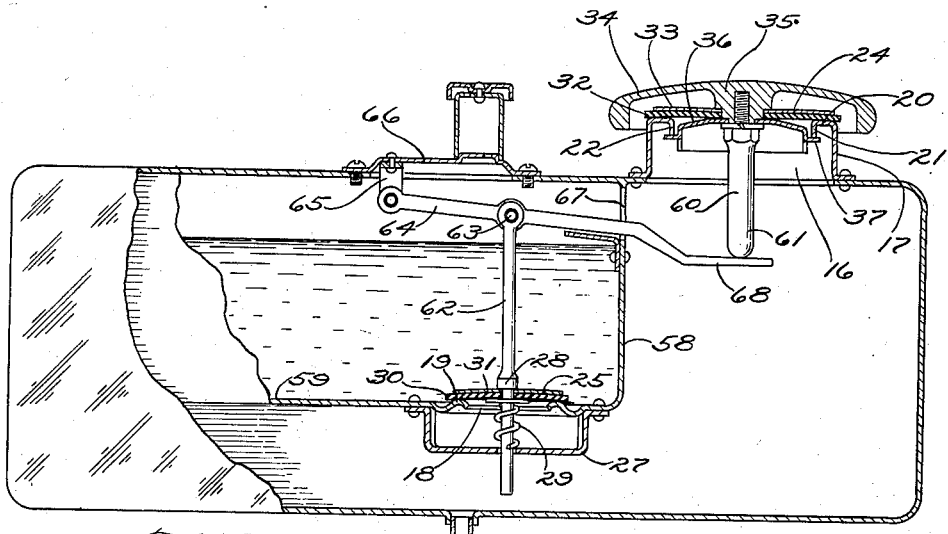
Figure 10:
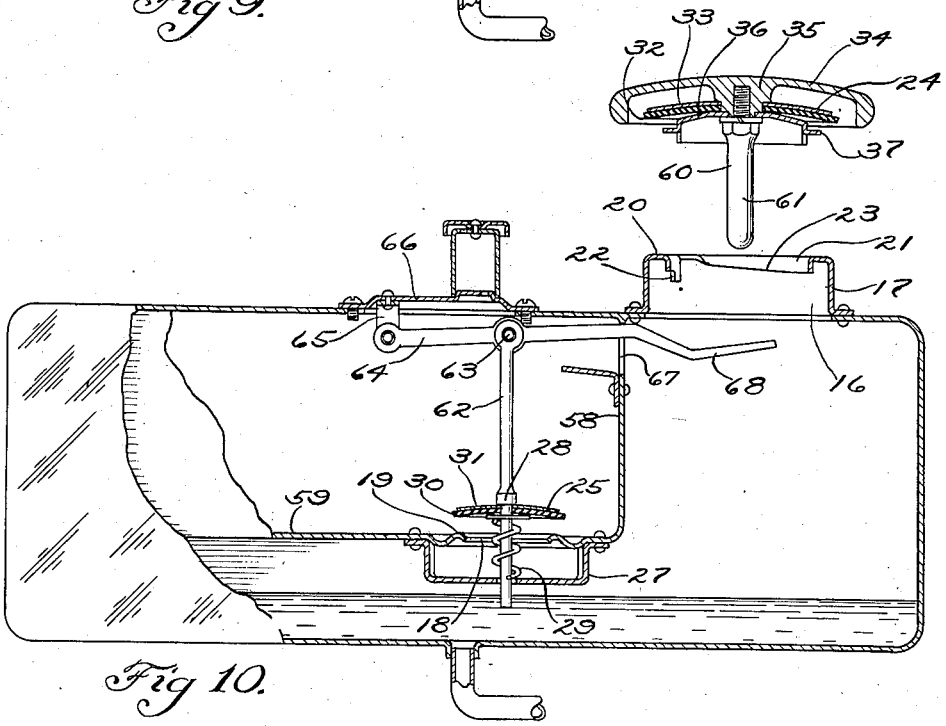

Figs. 9 and 10, disclose views similar to the foregoing, but of a form of my invention materially modified as compared with the others I have shown.

Figure 1:
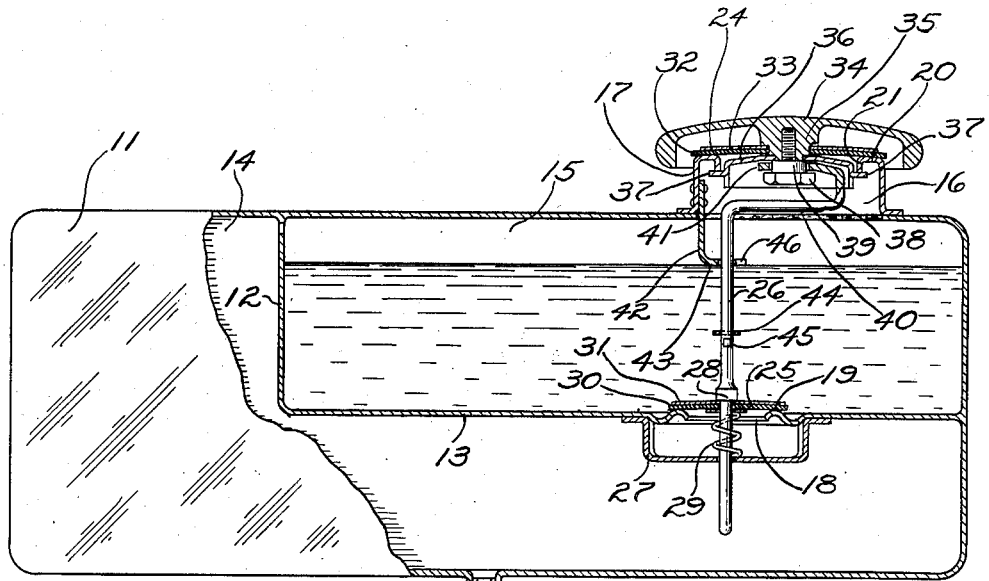
Figures 1 and 2 are fragmental sectional elevations of tanks equipped with one form of my invention, showing respective closed and open positions of the valves.
Figure 2:
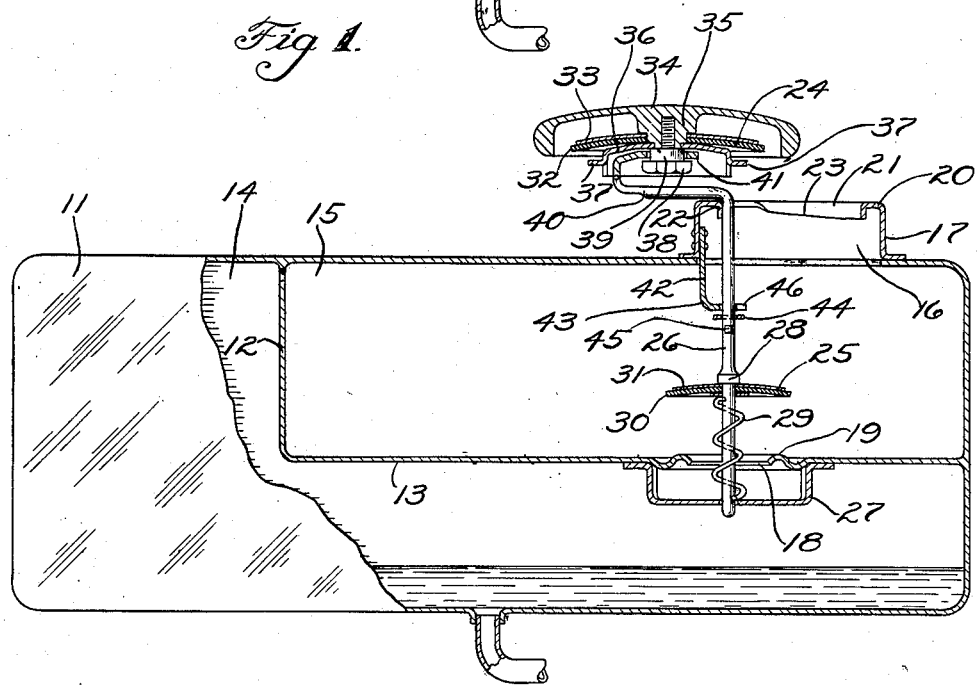

A description of my invention, as shown in Figs. 1 and 2, now follows. In these views I have disclosed a tank body 11 which contains interior walls 12 and a bottom 13 joining the walls 12 to make two compartments within the tank body, which I may designate as main tank 14 outside the walls 12 and bottom 13, and reserve tank 15 within the walls. In the top of the tank body an opening 16 is provided, surrounded by a collar 17, and in the bottom 13 a port 18 is provided, surrounded by a valve seat 19. An inwardly extending valve seat 20 on collar 17, is terminated by a pair of cap locking lugs 21 and 22, the lower edge of each of which is inclined as shown at 23 in Fig. 2.

A valve 24 serves to close opening 16 by engagement with seat 20, while a valve 25 serves to close port 18 by engagement with seat 19. These two valves are connected by a stem 26, the lower end of stem 26 being mounted to reciprocate in a strap 27 across port 18 beneath bottom 13. A shoulder 28 on stem 26 serves as a support or bearing against which valve 25 is held normally by a spring 29 on the stem 26, the lower end of which spring bears against strap 27. Also, the function of spring 29 is to hold valve 25 and stem 26 in the elevated position shown in Fig. 2, at such times as reserve tank 15 is to be filled or emptied, as will be explained. It may also be pointed out that valve 25, which is free to rotate on stem 26 against shoulder 28, preferably consists of two elements. One of these elements is the valve disc 30 which is of sealing material such as fiber, and the other element is of metal in the form of a spring disc 31 which acts to yield from the slightly concave condition shown in Fig. 2, when the valve is open, to the flattened condition shown in Fig. 1, when the valve is pressed upon its seat to close the reserve tank against emptying.

Valve 24 which closes opening 16 is constructed in the same manner as valve 25, in that it has a sealing disc 32 which is backed by a metal disc 33 which is slightly concaved to render it spring like in action, whereby in opened position, as shown in Fig. 2, the disc is in cupped condition and in closed position on seat 20, as shown in Fig. 1, the backing and sealing discs are in flattened condition.

To mount valve 24 I have provided the cap 34 with a centrally positioned lug 35, upon and against a shoulder of which the valve 24 bears. The valve, in turn, is held in position by lock 36 which enters within the opening of collar 17 and has outwardly extending fingers 37 which engage the inclined edges 23 of locking lugs 21. This lock is held tightly against movement on lug 35 against a shoulder formed thereon beneath valve 24 so that the valve is free to turn during the locking and unlocking operations which will be explained.

This is accomplished by a cap screw 38 through pressure of a shoulder 39 thereon, which shoulder also mounts the upper end of valve stem 26 whereby the cap 34, valve 24, and lock 36 are capable of rotation on stem 26 for locking and unlocking purposes.

The valve stem 26, by which the two valves and the cap are secured as a unit, is bent to form a right angle arm 40 which is adapted, when the cap occupies open position as shown in Fig. 2, to rest upon valve seat 20, thereby holding the valve 25 open. The end of the valve stem beyond arm 40, is bent upwardly and back upon itself, and terminates in a looped end 41 having rotative bearing on cap screw shoulder 39, whereby the valve and cap unit is functioned.

As a means whereby the valve and valve stem unit is supported in position to operate relatively to the seats 19 and 20, I have provided a bracket 42 which is fastened to the inside of the collar 17 and, extending into tank 13, terminates in a horizontal foot 43 through which the valve stem passes for reciprocation therein. A pin 44 in the valve stem beneath bracket foot 43 limits upward movement of the valve unit so as to prevent displacement of the lower end of the stem from strap 27.

As a means whereby the valve unit may be removed for purposes of repair and the like, I have equipped stem 26 with diametrically opposed flat bottomed grooves 45 which when pin 44 is removed, will permit the valve unit to be lifted higher until the grooves register with a notch 46 in the end of foot 43, at which time the stem may be slipped from the bracket foot and the entire unit thus freed for removal.

When the tanks equipped with my novel construction are to be filled, the cap is revolved to free its lock fingers 37 from inclined edges 23 of the locking lugs 21 and 22, whereupon spring 29 will lift the entire valve unit so that it may be swung around to the position disclosed in Fig. 2, thereby uncovering the collar opening so that the tanks may be filled. Fluid passes through port 18 to enter main tank 14, which, gradually becomes filled, simultaneously filling reserve tank 15. The valve unit is then moved to close both port 18 and the opening of collar 17. Thus the fluid in reserve tank 15 is trapped away from that in main tank 14, so that as the main tank becomes emptied, there remains the un-used reserve supply of tank 15, both of which conditions are shown in Fig. 1. Then, the reserve supply is called into service by merely rotating cap 34 until its fingers 37 disengage locking lugs 21 and 22, whereupon the valve unit is allowed to rise under influence of spring 29, thereby removing valve 25 from seat 19 and uncovering port 18 through which the reserve tank fluid passes to occupy the bottom of main tank 14, from which it may be used until a renewed supply fills both tanks for a repetition of the operation just described.

Figure 3:
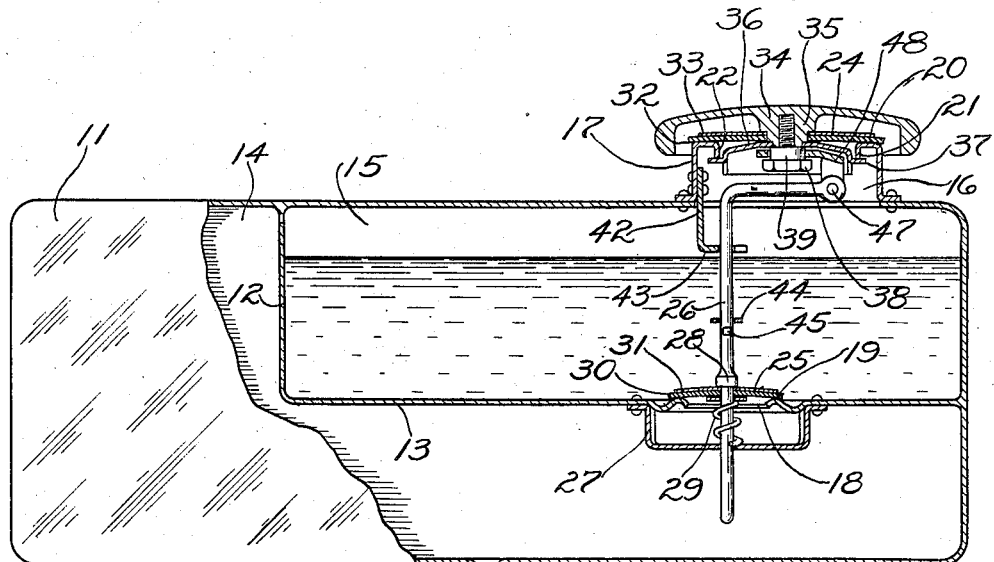
Figs. 3 and 4 are views similar to Figs. 1 and 2, and showing a modified form of my invention, in respective closed and open positions of the valves.
Figure 4:
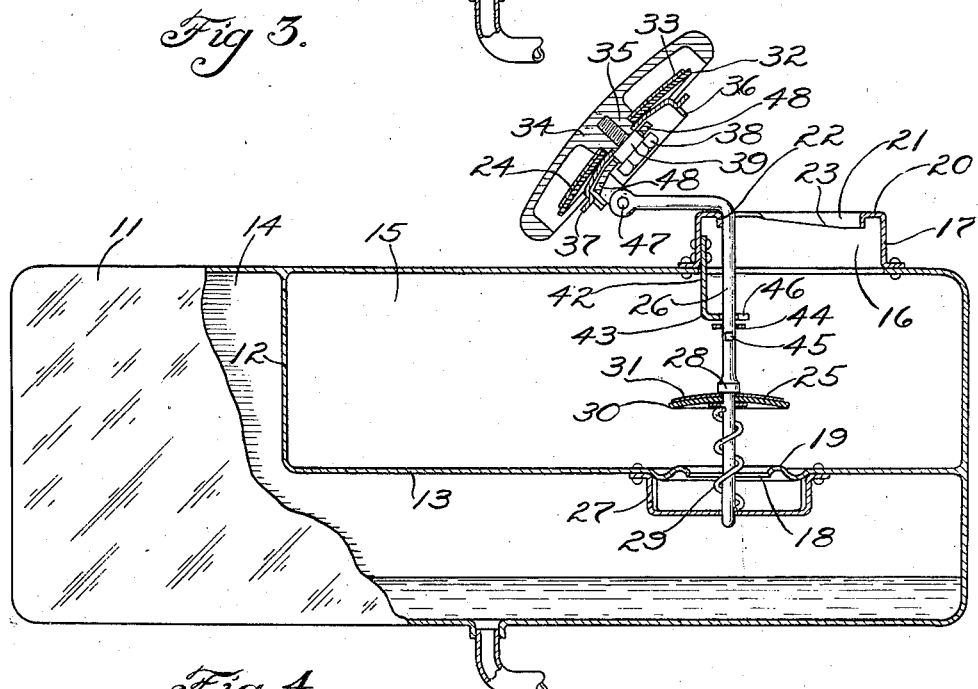

In Figs. 3 and 4, the construction I have shown is like that just described, except as to the valve stem construction and the manner of fastening the filler cap to the stem. This differentiation consists in terminating stem arm 40 in a pivot 47 which has attached thereto a loop 48. The loop 48 is carried by the shoulder 39 of cap screw 38, just as loop 41 of the previously described construction is attached to the cap. This difference in the construction shown in Figs. 3 and 4, as just described, permits of the rotative movement of the cap as was described in connection with Figs. 1 and 2, as well as the additional pivotal movement by means of which the cap may be tilted to carry it clear of the opening in the collar 17, as suggested in Fig. 4, thereby affording the user full access to the opening at the time of filling the tank. In all other respects the construction shown in Figs. 3 and 4 is identical with that previously described and for this reason I have employed the same reference numerals where the elements of the construction are identical. The operation of the device obviously being identical with that of the device shown in Figs. 1 and 2, the description of its operation will be understood clearly if reference is made to the description of the operation of the previously described device.

Figs. 5 and 6 disclose a construction which varies from those shown in the previously described construction in certain essential details, and yet, with all, still embodies features which are in common with those previously described. The novel features embodied in this construction consist in the cap mounting and means by which the valve stem is operated to open and close communication between the two tanks. Features in common with the previously described constructions have been given the same reference numerals as these like parts in these constructions.

The cap 34, valve 24, and lock 36 are identical with the same parts heretofore described, and are fastened by the shouldered screw 38 as heretofore, the collar 17 being identical for mounting the cap. In addition, loop 48 is connected with a link 49 which is of scroll shape, the inner end of said scroll being pivotally connected with a bracket 50 extending from the inner wall of collar 17. The scroll shaped link 49 operates as a cam on the upper end of valve stem 51, by means of which reserve tank valve 25 is mounted. To support stem 51 a foot 52 on bracket 50 has been provided, the upper end 53 of the valve stem 51 being removable when necessary for purposes of repair and the like.

Lifting of the valve 25 is obtained, as heretofore, by the spring 29 which is located beneath it, while closing movement of the valve is obtained by the cam shaped end of link 49 bearing upon the end of the valve stem to press it downwardly when the link is moved from the position shown in Fig. 6 to that shown in Fig. 5. The cap 34 being, in turn, pivoted to the link, is permitted to assume either the position shown in Fig. 5, when the tank is closed, or the position shown in Fig. 6, when the tank is opened. Thus it will be seen that substantially the same results as were obtained with the previously described constructions have been obtained in this modified construction, just described, except that the cap is enabled to operate to much better advantage to clear the filler opening and a more powerful closure or clamping action is exerted on the valve 25.

Figs. 7 and 8 disclose another development of the invention. Here we have the reserve valve 25, the cap 34 and the main valve 24, as well as their immediately associated seat parts, to be identical with the previously described constructions, and, therefore, have used the same reference numerals as have been applied to the previously described constructions. The distinction found in this construction lies in the formation of the lock 54 and in the formation of the valve stem 55 of this construction. Lock 54 is identical with the lock 36 of previously described constructions, except as to the skirt 56 of this lock, which skirt is made long enough to engage the top of the valve stem head 57. In operation the head of the valve stem stands as shown in Fig. 8 when the cap 34 is removed. Then, when the cap is placed on the collar 17, the stem is pressed downwardly to move valve 25 to close port 18, the act of turning the cap causing inclined lug 23 to force the lock downwardly through contact of its fingers 37 therewith, thereby sealing both port 18 with valve 25 and filler opening 16 with valve 24. Thus, in this construction the cap unit is rendered a separate part not attached to the reserve valve and its attached parts.

As a further example of the adaptability of my invention to different forms of construction, I have shown an embodiment in Figs. 9 and 10, which bears features of novelty in common with all the forms I have disclosed, but which, more particularly, resembles the form shown in Figs. 7 and 8, in that it permits of a main filler cap and valve which is an entirely separate unit from the remainder of the structure. This last illustrated form of the invention also incorporates the idea of a filling operation whereby the main tank is filled directly from the filler opening and the reserve tank is filled indirectly from the main tank; that is, the reserve tank is filled through the same port through which the fluid passes back into the main tank in furnishing the reserve supply to the main tank.

These distinctions are obtained by means of the following differences of construction which appear in the following description. First of all, the reserve tank walls 58 and bottom 59 are located so that a clear passage from the filler top opening 16 is had directly into the main tank, as Figs. 9 and 10 disclose. The cap 34 of this form of the invention is identical with the other forms of the invention, already described, except as to the cap screw by means of which the cap 34, valve 24 and lock 36 are held together. This cap screw has been changed for a special element 60 functioning as a cap screw, but having a head elongation 61 which operates as a finger to function the reserve valve.

The reserve valve 25 and its associated seat parts are identical with the same parts heretofore described, but the valve stem 62 is provided with a pivot 63 at its upper end, by means of which it is connected to and operates a lever 64 pivoted to a bracket 65 on the underside of a removable plate 66 which affords access to the tank interior for removal of the reserve valve mechanism. Lever 64 extends through the inner end wall 58 of the reserve tank at 67, and has its end 68 terminate beneath and in the path of cap finger 61 so that the act of closing the main tank by valve 24, will cause finger 61 to press lever end 68 downwardly, thereby moving valve 25 to closed position. Removal of the filler cap from the collar 17 will permit lever 64 to be lifted by valve spring 29 as valve 25 lifts from its seat. Thus, in each of the forms of my invention, as above described, I have incorporated the same principles. Obviously, other deviations from these illustrated forms may be made without departing from the spirit and scope of my invention as set forth in the appended claims.

Having thus described my invention what I claim is:

1. A reserve liquid supply device comprising, in combination with a main supply tank and a reserve supply tank, a filler opening for one of said tanks, a port between the lower portion of said reserve tank and said main tank, said filler opening being in offset relation to the axis of said port, a valve to close the filler opening, a valve to close the port, means connecting the valves operable upon movement of the first mentioned valve from its seat to move the second mentioned valve from its seat, and a cap connected to the valve for the filler opening, whereby removal of the cap will open the valves and replacement of the cap will close the valves.

2. A reserve liquid supply device comprising, in combination with a main supply tank and a reserve supply tank, one of said tanks having an exterior filler opening and a port between the lower portion of said reserve tank and said main tank, said filler opening being offset laterally relative to said port, a valve for the filler opening and a valve for the port, means connecting the valves for simultaneous operation of both valves, and a cap for the filler opening operatively associated with the valve thereof, whereby removal of the cap will open the valves and replacement of the cap will close the valves.

3. A reserve liquid supply device comprising a main supply tank and a reserve supply tank, one of said tanks having an exterior filler opening, said reserve supply tank having a port in its lower portion communicating with the main supply tank, the axis of said filler opening being offset and substantially parallel to the axis of the port, a valve closing the filler opening, a cover for said valve, a valve closing the port and means between said valves to function upon removal of the cover to open the valves and upon replacement of the cover to close the valves.

4. A reserve liquid supply device comprising a main supply tank and a reserve supply tank, each tank having a filler opening, one of said filler openings being in the lower portion of said reserve tank and also serving as a discharge opening from the reserve tank to the main tank, the other filler opening being in the main supply tank and in offset axial relation to the filler-discharge opening, said filler-discharge opening and the other filler opening each having a valve to close them, said valves being interconnected for simultaneous operation, a cap covering said other filler opening and operatively associated with one of said valves, whereby removal of the cap will open said filler and filler-discharge openings and replacement of the cap will close both of said openings.

5. A reserve liquid supply device comprising a main supply tank, a reserve supply tank, one of said tanks having a filler opening, said reserve supply tank having in the lower portion thereof a common filler and discharge opening into the main supply tank, said filler opening being in non-coaxial relation to the filler-discharge opening, a cap to close the first mentioned opening, a valve to close the second mentioned opening, and linkage connected with the valve and operatively associated with the cap to effect closure of the valve when the cap is in closed position and opening of the valve when the cap is in open position.

6. A reserve liquid supply device comprising a main supply tank and a reserve supply tank within the main supply tank, said reserve tank having a filler opening and a port in its lower portion providing inter-communication between said tanks, said filler opening and said port being in offset relation to each other, valves for said filler opening and said port, a mechanism operatively associated with said valves for synchronizing opening and closing movement of both valves when one of said valves is manipulated, and a cover carried by one of said valves.

7. In a liquid supply device, a main tank and a reserve tank, said reserve tank having a filler port therein, a second port between the lower portion of said reserve tank and said main tank, a valve to close the second mentioned port, a spring actuated stem mounted on the valve and having means thereon extending adjacent the filler port, a closure for the filler port operatively associated with said means and adapted when closing the filler port to hold the valve closed, and when removed from the filler port to permit the spring actuated stem to open the valve.

8. In a liquid supply device, a main tank and a reserve tank, one of said tanks having a filler port therein, a second port in the lower portion of said reserve tank communicating with said main tank, a valve to close the second mentioned port, a spring urging said valve to open position and a stem mounted on said valve and extending adjacent said filler port, a closure having means thereon operatively associated with said stem and adapted when said closure is closing the filler port to hold said valve closed, and when the closure is detached from the filler port to permit said valve to open.

9. A liquid reserve supply device comprising a main supply tank, a reserve supply tank within the main supply tank, one of said tanks having a filler port therein, a communicating port in the lower portion of said reserve tank, a valve closing said communicating port, spring means to open said valve, means limiting the opening movement of the valve, a closure closing the filler port, a valve stem operatively associated with the valve and having means thereon extending adjacent to and coacting with the closure to retain said valve in closed position, whereby when the closure is removed from the filler port said valve automatically opens the communicating port.

10. A liquid reserve supply device comprising a main supply tank, a reserve supply tank within the main supply tank, one of said tanks having a filler port therein, a communicating port in the lower portion of the reserve tank, a valve adapted to close said communicating port, resilient means for holding said valve open, a valve stem operatively associated with said valve and having means thereon extending adjacent the filler port, a detachable closure for said filler port cooperating with said means on said valve stem on application of said closure to said filler port to positively close said communicating port and said filler port simultaneously.

11. A reserve liquid supply device comprising, in combination with a main supply tank and a reserve supply tank, a filler opening for one of said tanks, a port in the lower portion of said reserve supply tank communicating with said main supply tank, said port and filler opening being located in non-coaxial relation, a valve closing said filler opening, a second valve closing said port, linkage carried by one of said tanks and operatively associated with said valves, whereby movement of the first mentioned valve to open and close said filler opening moves the second valve to open and close said port.

12. A reserve liquid supply device comprising, in combination, a main tank, a reserve tank within said main tank, a filler opening in one of said tanks, a port in the lower portion of said reserve tank opening into said main tank, the axis of said filler opening being in non-coinciding relation to the axis of the port, a closure for said filler opening, a valve for said port, resilient means associated with said valve adapted to urge said valve away from said port, linkage connected to said valve and operatively associated with the filler closure, whereby removal of said filler closure will open said valve and replacement of said filler closure will close said valve.

GLEN A. JOHNSON.